US012642164B2

(12) United States Patent (10) Patent No.: US 12,642,164 B2

Gilstring (45) Date of Patent: Jun. 2, 2026

(54) SINGULATING DEVICE, AGRICULTURAL IMPLEMENT AND METHOD OF DISTRIBUTING GRANULAR MATERIAL TO GROUND

(71) Applicant: Väderstad Holding AB, Väderstad (SE)

(72) Inventor: Gert Gilstring, Vadstena (SE)

(73) Assignee: Väderstad Holding AB, Väderstad (SE)

( * ) Notice: Subject to any disclaimer, the term of this patent is extended or adjusted under 35 U.S.C. 154(b) by 480 days.

(21) Appl. No.: 18/278,041

(22) PCT Filed: Feb. 21, 2022

(86) PCT No.: PCT/SE2022/050186

§ 371 (c)(1),
(2) Date: Aug. 21, 2023

(87) PCT Pub. No.: WO2022/182279

PCT Pub. Date: Sep. 1, 2022

(65) Prior Publication Data

US 2024/0130268 A1 Apr. 25, 2024
US 2024/0224836 A9 Jul. 11, 2024

(30) Foreign Application Priority Data

Feb. 23, 2021 (SE) .................................... 2150191-1

(51) Int. Cl.
*A01C 7/04* (2006.01)
*A01C 19/02* (2006.01)
(52) U.S. Cl.
CPC .............. *A01C 19/02* (2013.01); *A01C 7/046* (2013.01)
(58) Field of Classification Search
CPC ......... A01C 19/02; A01C 7/046; A01C 7/044; A01C 7/0443; A01C 7/127
See application file for complete search history.

(56) References Cited

U.S. PATENT DOCUMENTS 4,285,444 A * 8/1981 Tye ......................... A01C 7/046
221/211
5,325,800 A * 7/1994 Wisor .................... A01C 7/046
221/211
(Continued)

FOREIGN PATENT DOCUMENTS

DE 10154625 C1 * 4/2003 ........... A01C 7/0445
EP 0636305 A1 2/1995
(Continued)

*Primary Examiner* — Jamie L McGowan

(74) *Attorney, Agent, or Firm* — COATS & BENNETT, PLLC

(57) ABSTRACT

A singulating device (140) for singulating granular material comprises a base part (1401), a singulating part (1407) which is rotatable relative to the base part and which has a plurality of through-holes (14073) for receiving individual granules from said granular material with the ad of a pressure difference between opposite sides of the singulating part (1407), a closure part (1408) which is rotatable relative to the base part and which is attachable to the singulating part (1407), in order to form a closable space, such that the closure part (1408) is rotatable together with the singulating part (1407), and a motor (1409) for driving the closure part (1408) and the singulating part (1407). The singulating part (1407) is idly rotatably supported on the base part (1401). A drive shaft (14092) driven by the motor (1409) can be coupled to a driver arrangement (1408, 1413), in order to cause the driver arrangement to rotate. The singulating part (1407) is drivable by rotation of the driver arrangement (1408, 1413).

20 Claims, 9 Drawing Sheets

(56)                 References Cited

U.S. PATENT DOCUMENTS

| | | | | |
|---|---|---|---|---|
| 5,501,366 | A * | 3/1996 | Fiorido | A01C 7/0443 221/211 |
| 5,535,917 | A * | 7/1996 | Ribouleau | A01C 7/046 221/211 |
| 7,228,807 | B1 * | 6/2007 | VenHuizen | A01C 7/0445 111/185 |
| 9,137,942 | B2 * | 9/2015 | Adams | A01C 7/10 |
| 9,801,328 | B2 * | 10/2017 | Garner | A01C 7/122 |
| 11,730,079 | B2 * | 8/2023 | Wilhelmi | A01C 7/126 111/171 |
| 2005/0150442 | A1 * | 7/2005 | Friesen | A01C 7/0443 111/185 |
| 2011/0226168 | A1 * | 9/2011 | Shoup | A01C 7/0445 111/200 |
| 2012/0240838 | A1 | 9/2012 | Garner et al. | |
| 2014/0182493 | A1 * | 7/2014 | Adams | A01C 7/125 111/130 |
| 2015/0189826 | A1 * | 7/2015 | Wilhelmi | A01C 19/02 111/200 |
| 2016/0255768 | A1 * | 9/2016 | Garner | A01C 7/0443 |
| 2016/0366814 | A1 * | 12/2016 | Roszman | A01C 7/0443 |
| 2020/0315085 | A1 | 10/2020 | Bulmahn et al. | |
| 2020/0359551 | A1 * | 11/2020 | Donadon | A01C 7/0445 |
| 2021/0051841 | A1 * | 2/2021 | Buehler | A01C 7/046 |
| 2021/0298226 | A1 * | 9/2021 | Garner | A01C 7/125 |
| 2024/0057514 | A1 * | 2/2024 | Bassett | A01C 7/121 |
| 2024/0130268 | A1 * | 4/2024 | Gilstring | A01C 19/02 |

FOREIGN PATENT DOCUMENTS

| | | | | |
|---|---|---|---|---|
| EP | 1310147 | A1 | 5/2003 | |
| EP | 2926640 | A1 | 10/2015 | |
| EP | 3272197 | A1 * | 1/2018 | A01C 7/046 |
| EP | 3281510 | A1 | 2/2018 | |
| WO | 2012121658 | A1 | 9/2012 | |
| WO | 2017112989 | A1 | 7/2017 | |
| WO | 2019092538 | A1 | 5/2019 | |
| WO | 2019121085 | A1 | 6/2019 | |

* cited by examiner

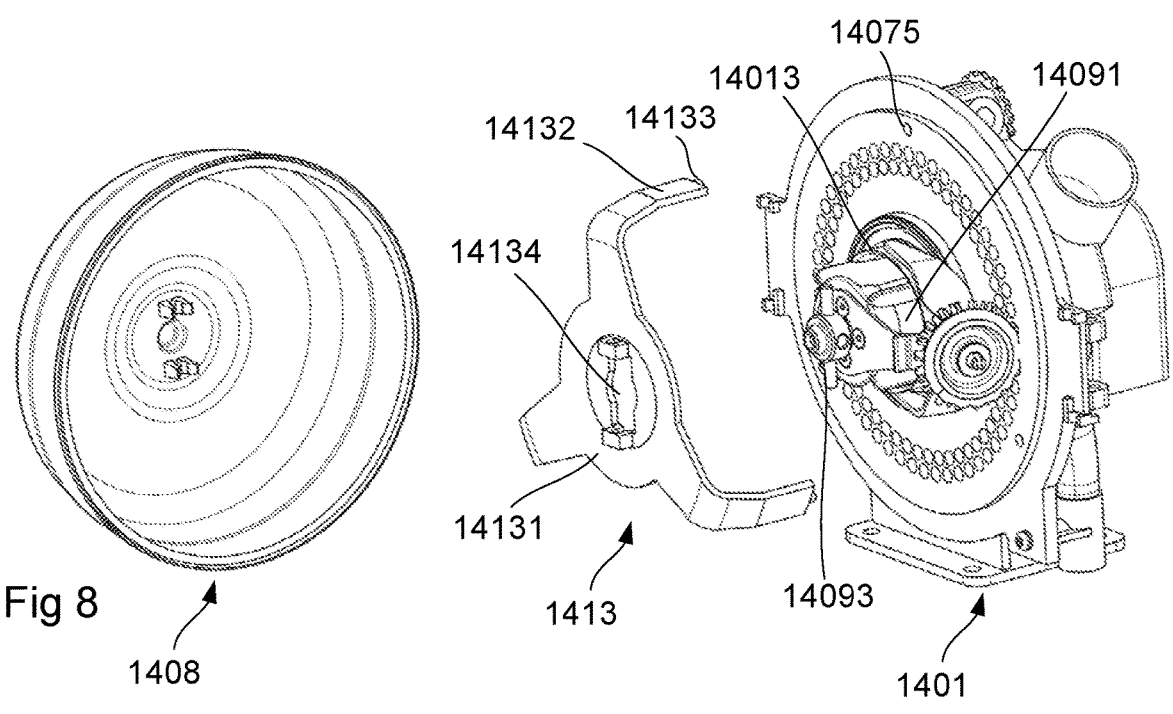
Fig 8
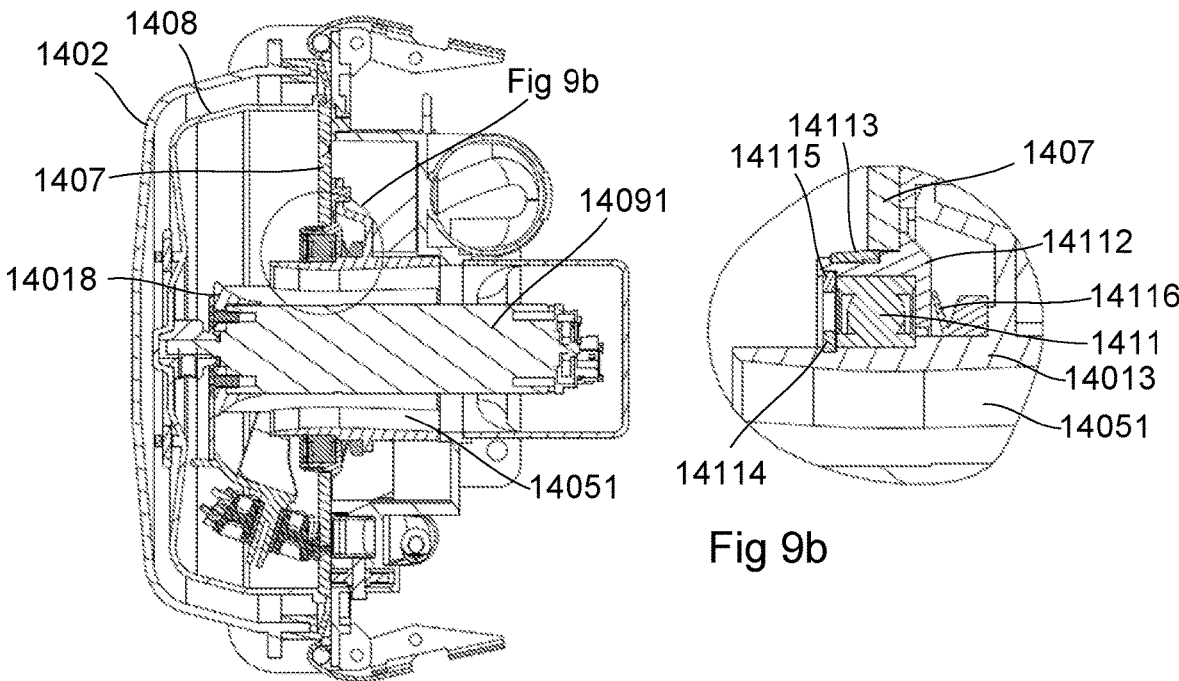
Fig 9a
Fig 9b

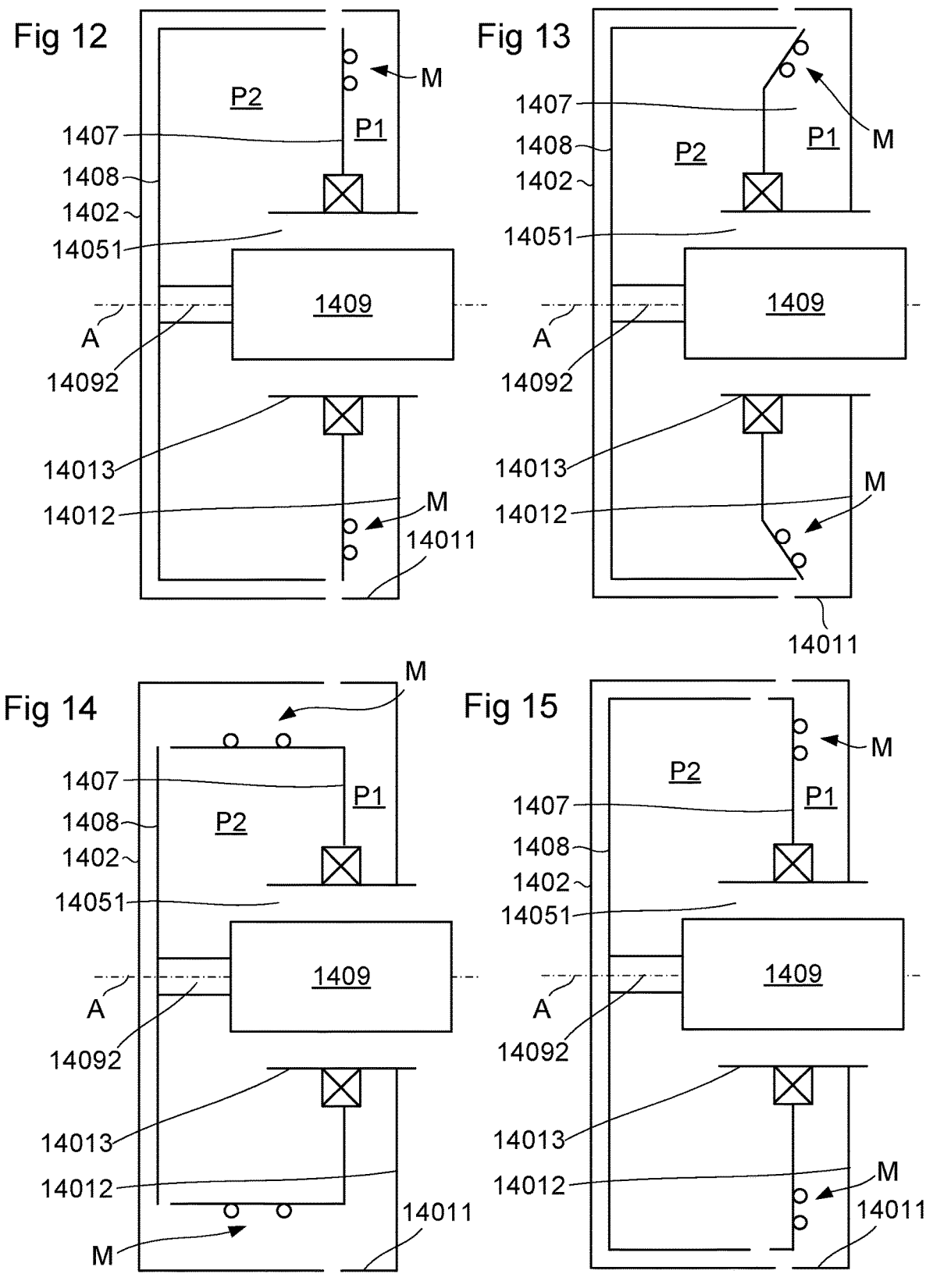

SINGULATING DEVICE, AGRICULTURAL IMPLEMENT AND METHOD OF DISTRIBUTING GRANULAR MATERIAL TO GROUND

TECHNICAL FIELD

This document relates to a singulating device for singulating granular material, such as seed, fertilizer or pesticides, and to an agricultural implement comprising one or more such singulating devices.

The document also relates to a method of distributing granular material to ground over which an agricultural implement travels.

Singulating devices of the type disclosed here are used especially in agricultural implements such as a seed drill, a fertilizer spreader or a pesticide spreader.

BACKGROUND

Singulating devices for use in agricultural implements, for distributing granular material to ground over which the agricultural implement travels, are known for example from US9137942BB, WO19092538A1 and WO19121085A1.

Such singulating devices are developed for use in "planters" or "precision seed drills", which have a plurality of row units with a singulating device on each row unit. Such machines are traditionally used to plant crops such as maize and soya beans. Precision seed drills are set up to feed a certain number of seeds per unit of length and to place the seeds at a uniform spacing from one another.

A second type of customary seed drill is what is called a volumetrically fed seed drill. Traditionally, this type of seed drill does not feed singulated seed and is instead set up to feed a certain volume of seeds per surface unit. There is traditionally no special control of how close together the seeds are placed.

However, there is interest in increasing precision even in volumetrically fed seed drills, since it is desirable to be able to optimize the amount of seed that is fed out. Therefore, singulating devices have become of interest even as a complement in volumetrically fed seed drills. This type of seed drill normally operates with a considerably smaller row spacing than in the case of precision seed drills.

There is therefore a need to make available a more compact singulating device in order to permit the use of singulating devices when sowing crops with small row spacings.

SUMMARY

An object of the invention is to make available an improved singulating device, especially a singulating device that can take up less space, especially in width.

The invention is defined by the accompanying independent claims. Embodiments are set forth in the accompanying dependent claims, in the description that follows and in the accompanying drawings.

According to a first aspect, a singulating device for singulating granular material comprises a base part, a singulating part which is rotatable relative to the base part and which has a plurality of through-holes for receiving individual granules from said granular material with the aid of a pressure difference between opposite sides of the singulating part, a closure part which is rotatable relative to the base part and which is attachable to the singulating part, in order to form a closable space, such that the closure part is rotatable together with the singulating part, and a motor for driving the closure part and the singulating part. The singulating part is idly rotatably supported on the base part. A drive shaft driven by the motor can be coupled to a driver arrangement, in order to cause the driver arrangement to rotate. The singulating part is drivable by rotation of the driver arrangement.

A "singulating part" can be a singulating disc, a singulating drum or the like.

A "closure part" can be a pressurizing bell or a disc which seals in the axial direction.

"Idly rotatably supported" means that the singulating part is supported in such a way that it can rotate freely, without its rotatability being limited by the effect of any motor.

In this context, the expression "closable space" signifies a space that it is possible to close sufficiently so that during operation, when an air overpressure is applied to the outside of the space, the pressure difference between the inside and outside of the space is maintained, such that granular material can be held at the holes with the aid of the pressure difference.

A singulating device of such configuration can be operated with low friction, since it is not necessary to provide any seal in sliding contact with the periphery of the singulating part.

A "driver arrangement" can be obtained in different ways, either as a separate part, for example as an auxiliary frame, or through an integrated part, such as using the closure part in order to pull the singulating part along.

By mounting the singulating part relative to the base part, rather than mounting it on the motor shaft, and by instead allowing the motor to drive the closure part directly, it is possible to save space in a direction parallel to the axis of rotation of the motor. In the most common placement of singulating devices, this direction is parallel to the transverse direction of the agricultural implement. A singulating device is thus obtained which takes up less space in the width direction.

The singulating part can be mounted and supported on the base part.

The base part can have an outer wall and a central portion located at a distance radially inwards from the outer wall, wherein the singulating part is mounted and supported on the central portion.

The central portion can extend through the singulating part, such that the central portion has an opening to a low-pressure side of the singulating part.

The singulating part can be sealed off from the central portion.

The seal can be provided directly between the central portion and the singulating part, or indirectly, for example between the central portion and a hub on which the singulating part is mounted in a sealed manner.

The motor can comprise a motor body, wherein the drive shaft is drivable in rotation relative to the motor body, and wherein the motor body is mounted on the base part and extends through the singulating part.

"Motor body" means the fixed part of the motor, as distinct from the motor shaft, which is rotatable relative to the motor body. The motor body can comprise a casing, the electromagnetically active parts of the motor, such as magnets, windings, etc., and an optional gear arrangement.

Since the motor body extends through the singulating part, it is possible to obtain a singulating device that is more compact in the axial direction of the motor, which is advantageous when a very small row spacing between row units is desired.

The motor body can have a first axial end, which has an opening for the motor shaft, and a second, axially opposite end, wherein the singulating part and the motor body are arranged such that no part of the singulating part is located nearer the first axial end than between 0 and 100%, preferably between 5 and 95%, between 20 and 80%, or between 20 and 50% of a total length of the motor body.

The base part has a motor holder, which is arranged in the central portion, wherein a ventilation gap for ventilation of a low-pressure side of the singulating part lies between the motor and an inner surface of the central portion.

The motor holder can be configured as a substantially cylindrical container designed to receive a motor. Alternatively, the motor holder can be configured as a radially open frame designed to receive a motor, or as a plurality of spacers which extend radially inwards from an inner surface of the central portion.

The ventilation gap can connect the low-pressure side of the singulating part to the environment, such that a flow of air through the singulating part can be maintained.

The placement of the ventilation gap between the motor and the central portion permits improved cooling of the motor.

The motor body can extend beyond the central portion on the low-pressure side of the singulating part.

The drive shaft can extend through the central portion, wherein a ventilation gap for ventilation of a low-pressure side of the singulating part lies between the drive shaft and an inner surface of the central portion.

The singulating device can further comprise a transmission device, with the motor being connected to the drive shaft via the transmission device.

By connecting the motor to the drive shaft via a transmission device, greater freedom is obtained in the placement of the motor in relation to other parts of the singulating device. In addition, it is then possible for two or more singulating devices to be driven with the aid of just one motor.

The singulating device can further comprise a guide, which can be arranged between the drive shaft and the central portion, such that said ventilation gap for ventilation of a low-pressure side of the singulating part lies between the guide and the inner surface of the central portion.

The driver arrangement can comprise an auxiliary frame which can form-fittingly engage with the singulating part for transmission of torque.

The auxiliary frame can be coupled to the motor shaft for transmission of torque, and the closure part can be fastened to the motor shaft and/or the auxiliary frame.

The auxiliary frame and the singulating part can be axially connected to each other.

The driver arrangement can be integrated with the closure part and can preferably be formed by the closure part.

The closure part can have an axial edge portion which is configured for engagement, especially form-fit engagement, with an edge portion of the singulating part.

The singulating part can have a radially outer edge portion which is configured for engagement, especially form-fit engagement, with an edge portion of the closure part.

A distal end of the motor shaft can have a coupling device for torque-transmitting coupling to a corresponding coupling device of the driver arrangement.

The coupling device can be configured to axially lock the driver arrangement to the motor shaft.

The singulating device can further comprise an arm, wherein the closure part can be idly rotatably supported relative to the arm, and wherein the arm can be pivotably fastened, preferably at the base part, radially outside the singulating part.

By virtue of such an arrangement, the closure part can be opened without being completely removed from the base part, which reduces the risk of an operator forgetting to put the closure part back.

The arm can be pivotably fastened to the base part or to the cover.

According to some embodiments, the singulating part can have a substantially conical surface, in which at least some of the holes are open.

The closure part can then be configured as a disc or as a drum.

According to other embodiments, at least some of the holes can be open in a mainly radial direction.

The singulating device can then be configured substantially as a cylindrical drum, with the holes in a lateral surface. The closure part can then be configured as a disc or as a bell.

For example, the singulating part can have an axially extending side wall, which forms a radial boundary of the closable space.

In such embodiments, the closure part can be substantially flat.

It will be appreciated that the closure part can be completely flat or, alternatively, slightly convex or concave.

According to other embodiments, the closure part can be configured as a substantially axially open container, having an axial base wall portion and, extending radially from the latter, a lateral wall portion.

In such embodiments, at least some of the holes can be open in a mainly axial direction. The singulating part can then be configured as a substantially flat disc.

The singulating device can further comprise a cover which is attachable to the base part such that the base part and the cover enclose a singulating space in which the closure part and the singulating part are rotatable, and in which, when said pressure difference between opposite sides of the singulating part is obtained, a higher pressure is present in the singulating space than in a space that is defined by the closure part and the singulating part.

The cover can be pivotably fastened to the base part, such that the cover is pivotable between a closed state and an opened state.

A second aspect concerns an agricultural implement, especially a seed drill, for distributing granular material to ground over which the agricultural implement travels, comprising a plurality of material outlets, wherein at least some of the material outlets are associated with a singulating device according to any one of the preceding claims, which is configured to supply the material outlet with singulated seed.

A third aspect concerns a method of distributing granular material to ground from an agricultural implement which comprises one or more singulating devices which each have a base part, a singulating part which is rotatable relative to the base part and which has a plurality of through-holes for receiving individual granules from said granular material with the aid of a pressure difference between opposite sides of the singulating part, a closure part which is rotatable relative to the base part and whose periphery is attachable to a periphery of the singulating part, such that the closure part is rotatable together with the singulating part, and a motor for driving the closure part and the singulating part. The method involves using the motor to cause the driver arrangement to rotate, and transmitting rotation from the driver arrangement to the singulating part. The singulating part is idly rotatably supported on the base part.

In the method, the rotation can be transmitted with the aid of the closure part, which is form-fittingly connected to the motor and to the singulating part.

Alternatively, the rotation can be transmitted by engagement between an axial edge portion of the closure part and a radial edge portion of the singulating part.

As a further alternative, the rotation can be transmitted with the aid of an auxiliary frame which is form-fittingly connected to the motor and to the singulating part.

BRIEF DESCRIPTION OF THE DRAWINGS

FIG. 2 shows a perspective view of a singulating device 140.

FIG. 3 shows a perspective view of the singulating device 140.

FIG. 8 shows an alternative configuration of the singulating device.

FIGS. 9a-9b show the singulating device with a detail of how the singulating part is suspended relative to the central portion.

FIGS. 12-15 show schematic diagrams of different ways of forming the singulating part and the closure part.

DETAILED DESCRIPTION

Figure 1A:
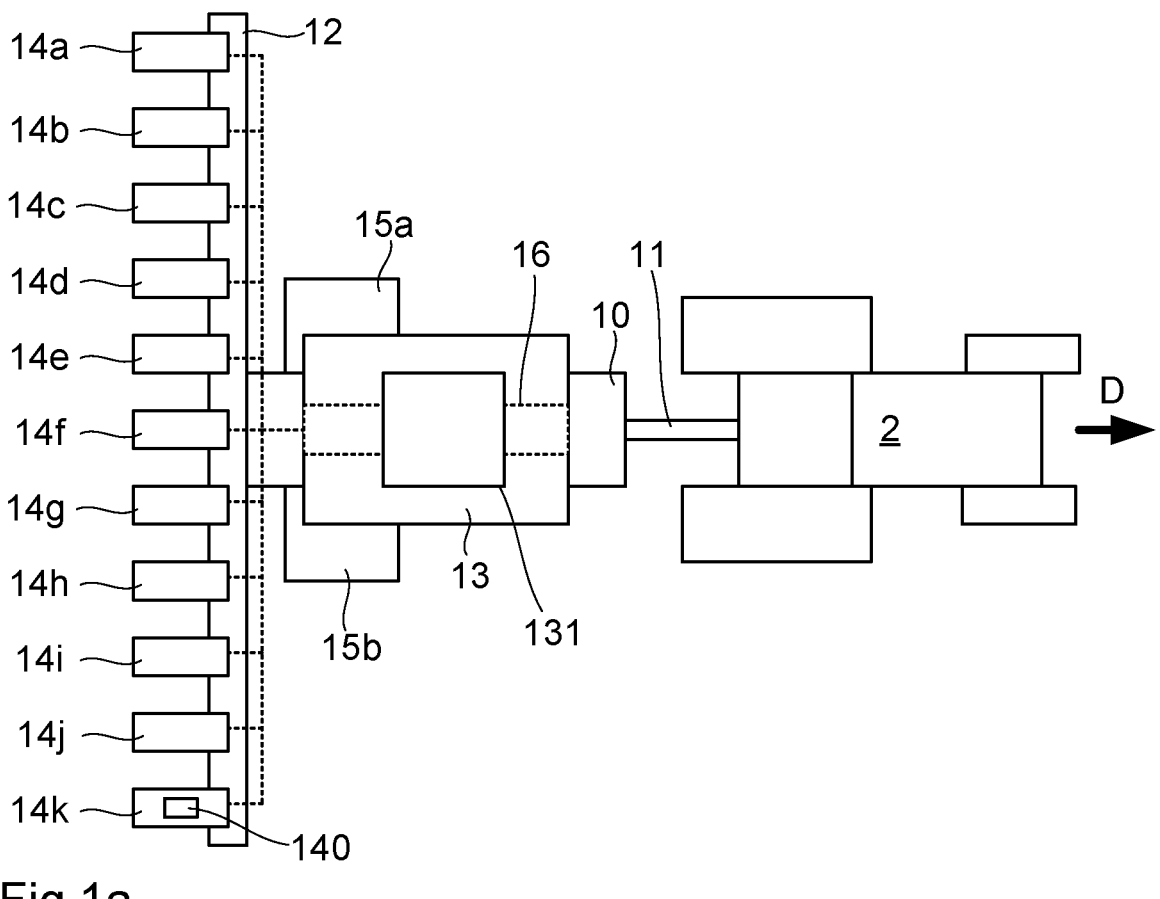
FIGS. 1a-1b show schematically, viewed from above and from the side, respectively, an agricultural implement 1, which is coupled to a towing vehicle 2, such as a tractor, and arranged in a direction of travel D. In the example shown, the agricultural implement is in the form of a seed drill with a central container.
Figure 1B:
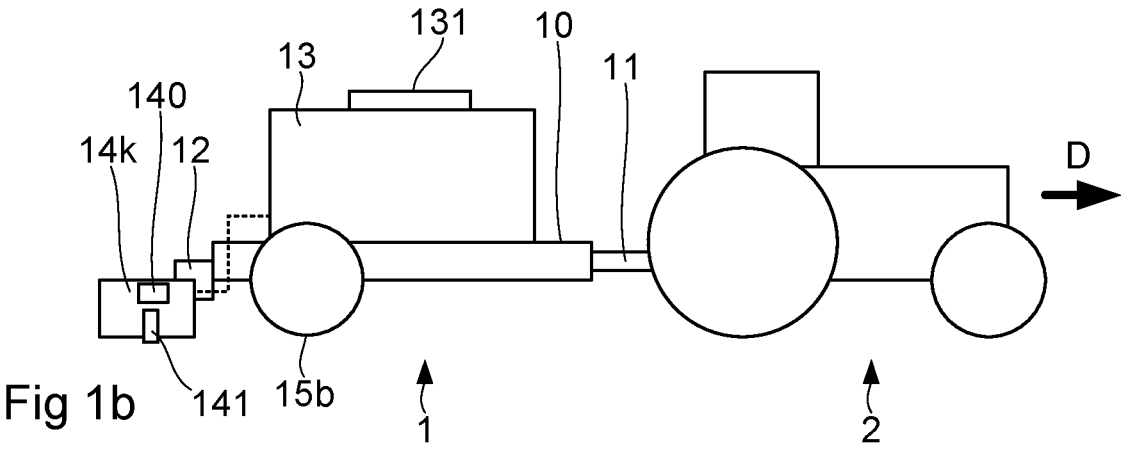

FIGS. 1a-1b show schematically, viewed from above and from the side, respectively, an agricultural implement 1, which is coupled to a towing vehicle 2, such as a tractor, and arranged in a direction of travel D. In the example shown, the agricultural implement is in the form of a seed drill with a central container.

It will be appreciated that a seed drill can have two or more such containers.

It will further be appreciated that the seed drill can be of any given type, such as a volumetrically feeding seed drill or a precision seed drill, which can have, but does not need to have, a central container which feeds material such as seed to a plurality of material outlets.

In the example shown, the agricultural implement has a main frame 10, a towing device 11, a cross frame 12, a container 13, which is supported by the main frame 10, wherein the container has an opening 131. The opening 131 can be provided with a closure, such as a lid or a tarpaulin.

The seed drill can be provided with one or more rows of material outlets, which can be configured as furrow openers or row units. The material outlets do not need to be arranged in strict rows.

The seed drill can feed seed directly from a container to the respective material outlet. Alternatively, the seed drill can feed seed to a plurality of material outlets via a distributor, which can distribute an airflow mixed with material to a plurality of material outlets.

In the example shown, the agricultural implement comprises a plurality of row units 14a-14k, which are supported by the cross frame 12, and at least one wheel 15a, 15b and/or one or more rolling ground supports of another type, such as rollers or roller wheels.

Each of the row units 14a-14k can be provided with a singulating device 140 for singulating seeds, and a material outlet 141. The material outlet can be configured in a number of different ways, such as a furrow opener or an outlet pipe in an arrangement comprising one or more of a seed furrow opener, a press wheel, a depth-regulating wheel and a seed furrow sealer. Alternatively, each row unit can have a dedicated container (not shown), which can be, but does not need to be, filled from a central container 13.

Figures 2, 3:
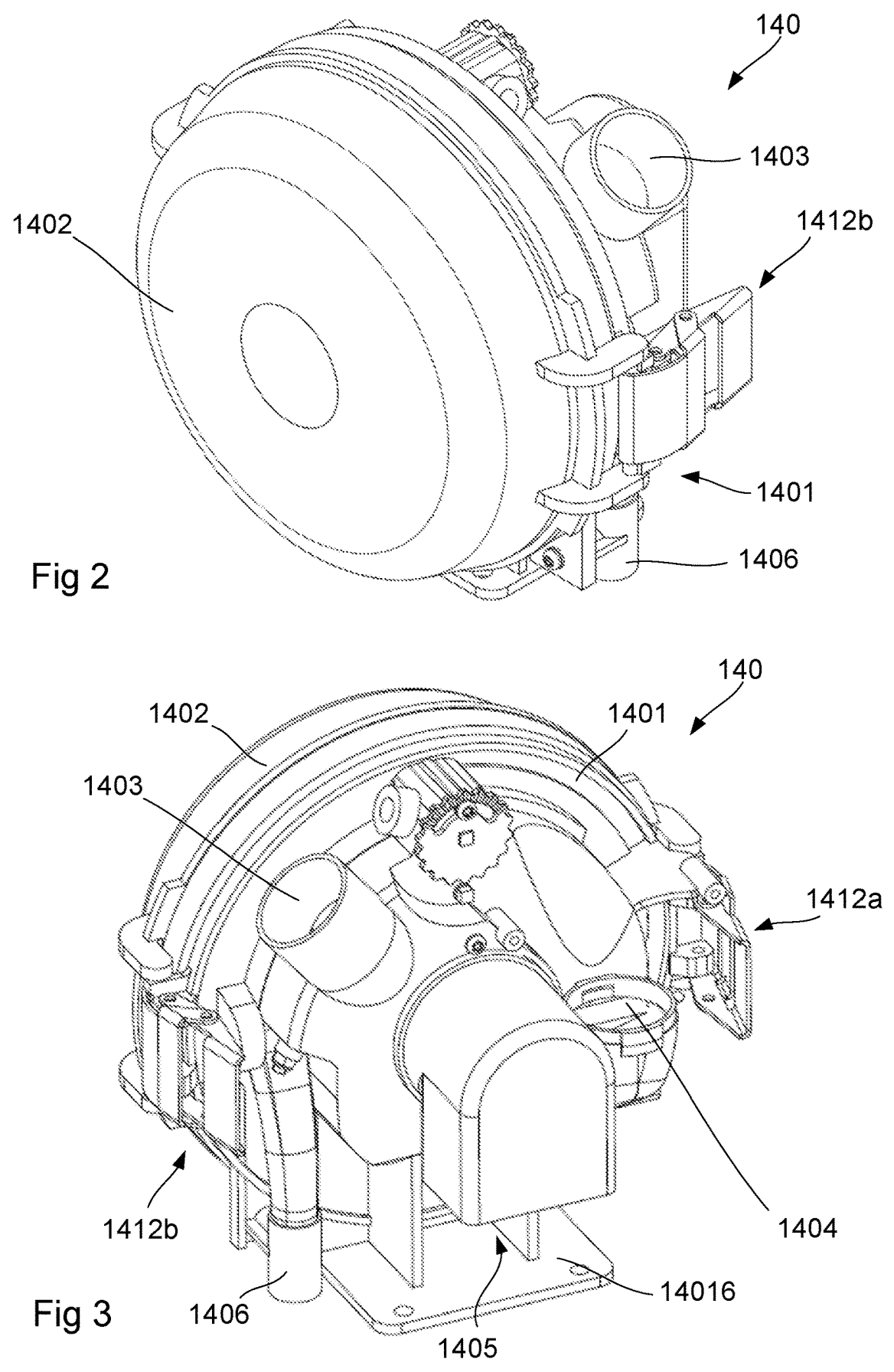

With reference to FIGS. 2 and 3, the singulating device 140 comprises a base part 1401 which, with the aid of a mounting flange 14016, is mounted on the frame of the agricultural implement 1, or of the row unit, a cover 1402, an inlet 1403 for compressed air, and an inlet 1404 for the granular material that is to be singulated. The singulating device 140 can also have a ventilation duct 1405 for ventilation of exhaust air, and an outlet 1406 for singulated material, which outlet 1406 is connected to the material outlet 141.

The cover 1402 can be fastened to the base part 1401 with the aid of one or more cover locks 1412a, 1412b and, in addition or alternatively, the cover 1402 can be fastened rotatably relative to the base part 1401, such that it can pivot between an open position and a locked position.

The cover lock 1412a, 1412b can be configured in a number of different ways, for example in the form of one or more rubber straps, buckles, snap-fit locks, bayonet catches or locking hooks. Alternatively, the whole cover can be brought into engagement with the base part with the aid of threads or bayonet fastenings.

Figure 4:
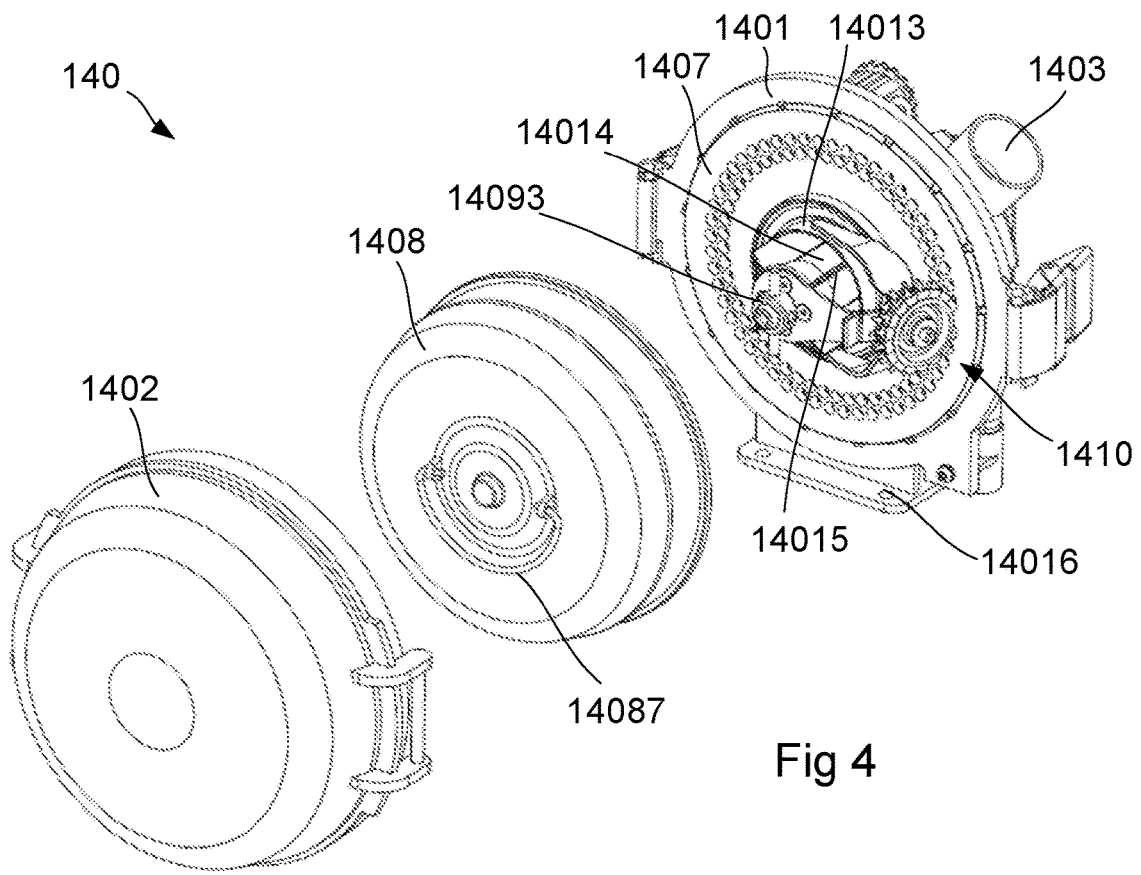
FIG. 4 shows a perspective and exploded view of the singulating device 140.
Figure 5:
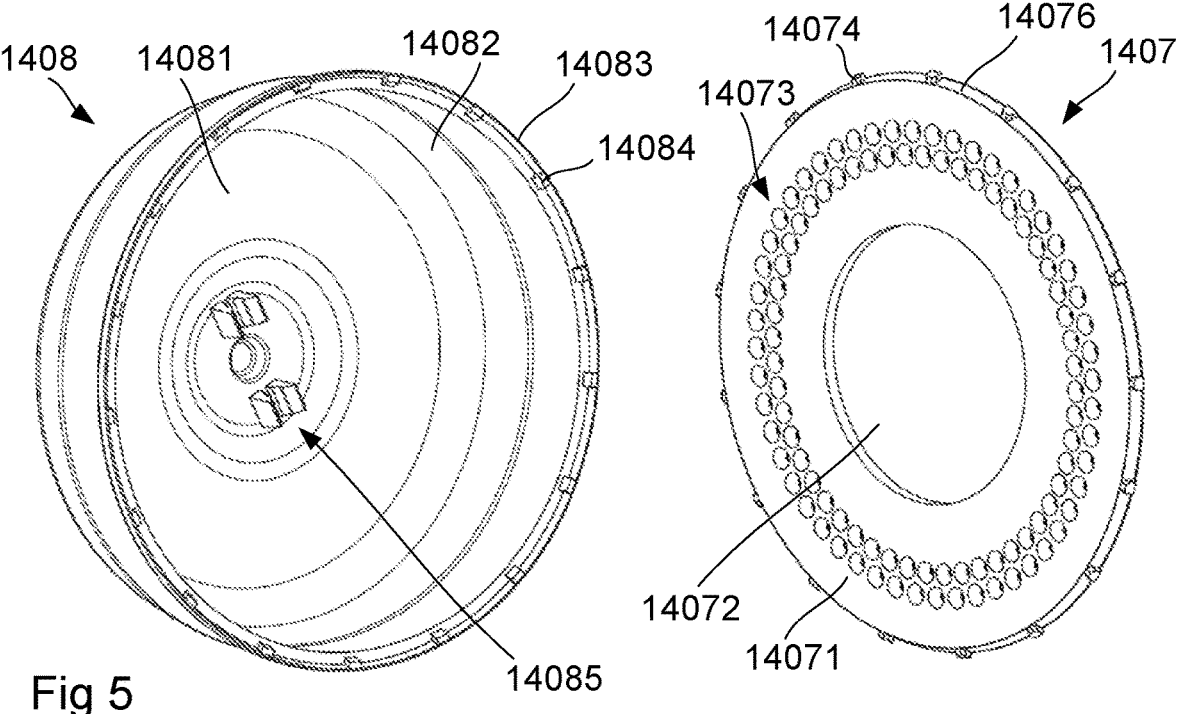
FIG. 5 shows a perspective view of a singulating disc and a pressurizing bell included in the singulating device 140.

With reference to FIGS. 4 and 5, the base part 1401 and the cover 1402 enclose a singulating space in which a singulating part, here in the form of a singulating disc 1407, and a closure part, here in the form of a pressurizing bell 1408, are arranged rotatably.

The pressurizing bell 1408 and the singulating disc 1407 are rotatable in the singulating space, while a pressure difference is produced between opposite sides of the singulating disc, such that there is a higher pressure in the singulating space than in a space that is defined by the pressurizing bell and the singulating disc.

The singulating disc 1407 can have a substantially circular periphery 14074 (FIG. 5) and a flat ring-shaped portion 14071, which has at least one circumferential row of through-holes 14073 for receiving granules. The size of the holes, the spacing between them and the number of rows of holes can be determined according to the type of material that is to be singulated.

The singulating disc 1407 can have a central opening 14072, which can be circular or polygonal and can have a diameter, or maximum dimension, of about 30-70% of the external diameter of the singulating disc, preferably 40-60% thereof.

With reference to FIG. 4, the singulating device 140 comprises a sealing part 1410 which has the purpose of locally breaking the pressure difference across the singulating disc, such that the granules slip from the singulating disc 1407 and can drop, be pulled or be blown down into the outlet 1406 for singulated material. The sealing part 1410 can, as a non-limiting example, be configured as a wheel which "rolls" relative to the singulating disc 1407, or as a flat part which slides relative to the singulating disc 1407.

With reference to FIG. 5, the pressurizing bell 1408 can be configured as a substantially cylindrical container which is axially open at one end and which can have a base wall 14081 whose normal direction can be substantially parallel to the axial direction, and a lateral wall 14082 extending substantially axially from the base wall 14081. The lateral wall 14082 has an edge portion 14083 which is configured for engagement with the singulating disc 1407. In the example shown, the edge portion 14083 has a plurality of engagement elements 14084 which are arranged at a distance from one another and which can have the shape of radially inwardly extending lugs.

Although the singulating disc is shown here as a flat disc, it will be appreciated that it can be configured in a number of different ways, for example as a completely or partially conical part, with the holes arranged on a conical surface, or as a cylindrical part, with the holes arranged in a lateral surface.

As is shown in FIG. 5, the singulating disc 1407 correspondingly has a plurality of engagement elements 14074 which are arranged at a distance from one another and which can have the shape of radially outwardly extending lugs.

It will be appreciated that the engagement elements 14084, 14074 can be configured in a number of different ways, for example as projections or recesses. A sealing strip can optionally be arranged on the pressurizing bell and/or on the singulating disc, in order to ensure sufficient sealing between the pressurizing bell and the singulating disc.

The pressurizing bell 1408 can have a coupling device 14085 at a central portion of the base wall 14081.

In the example shown, the coupling device 14085 is formed as a pair of jaws which are configured to engage with axially transverse rods on a distal portion of a motor shaft.

It will be appreciated that the coupling device can be configured in a number of different ways, for example as a snap-fit lock, threaded coupling, bayonet coupling or magnetic coupling.

Figures 6, 7:
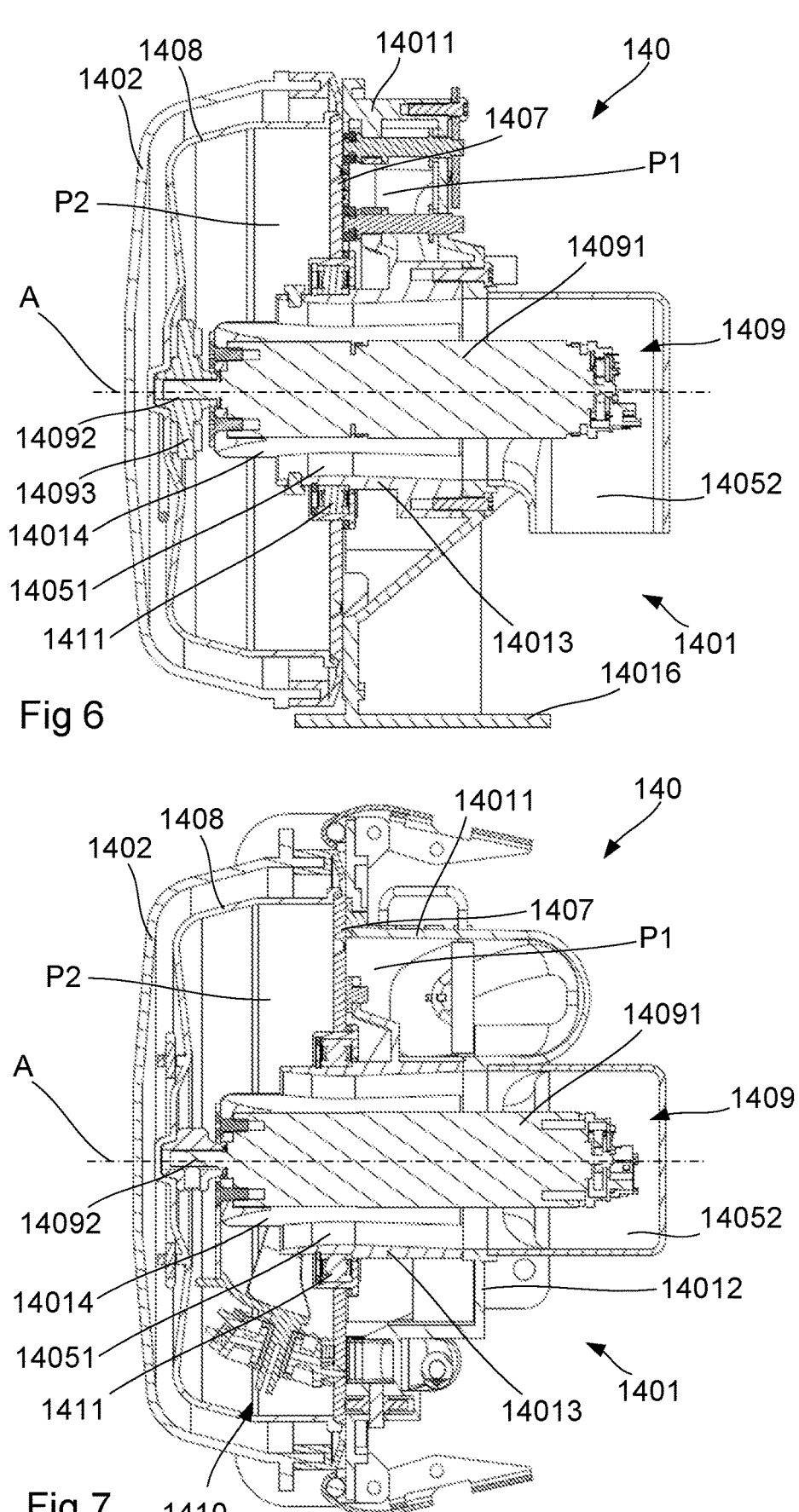
FIG. 6 shows a sectional view in a vertical plane of the singulating device 140.
FIG. 7 shows a sectional view in a horizontal plane of the singulating device 140.
Figure 10A:
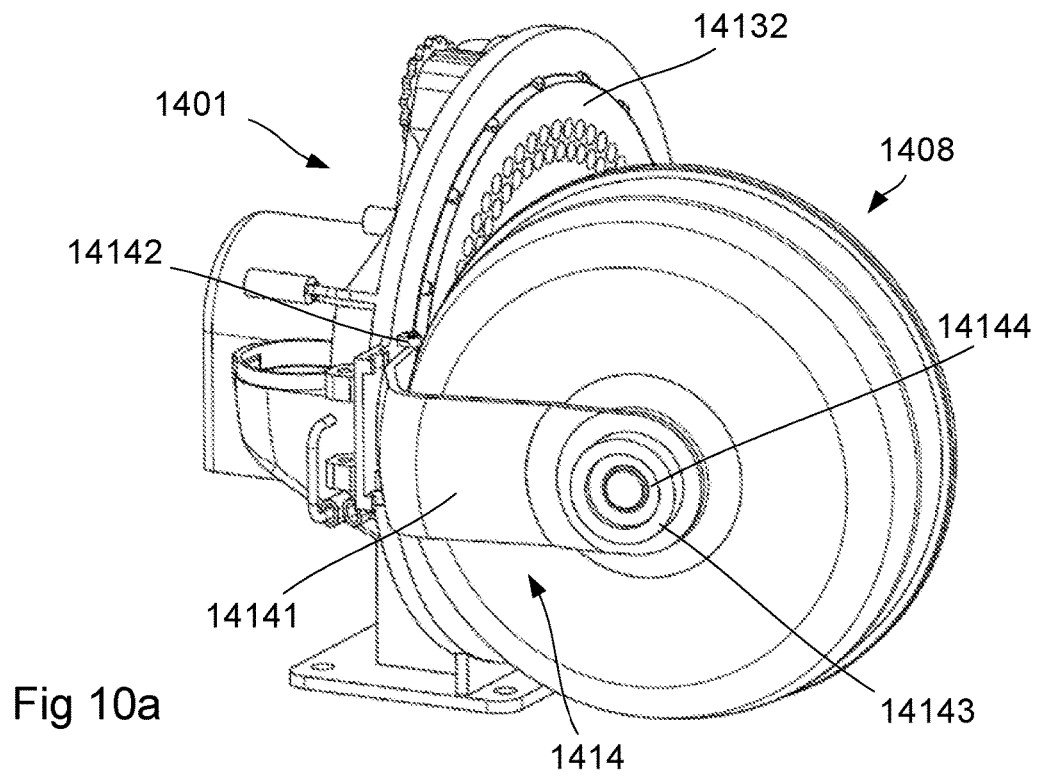
FIGS. 10a-10d show an alternative configuration of the singulating device.
Figure 10B:
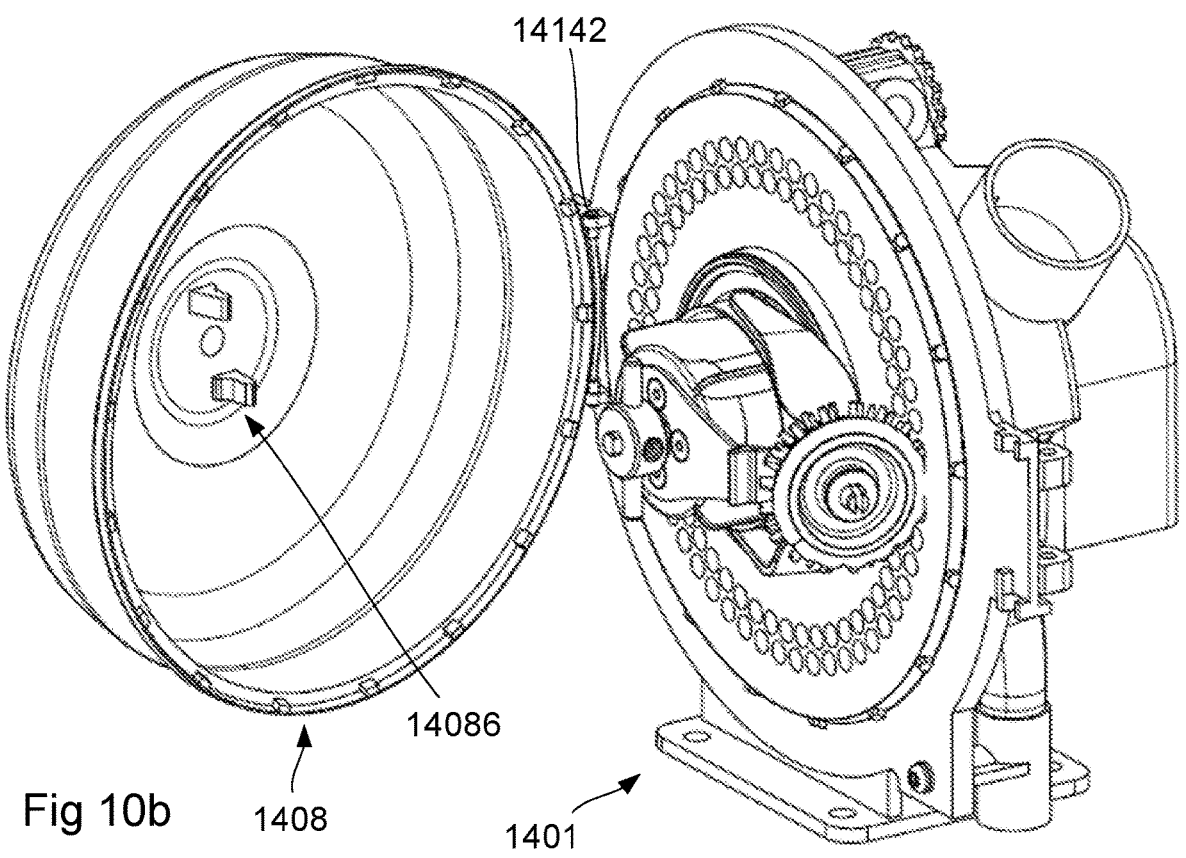
Figure 10C:
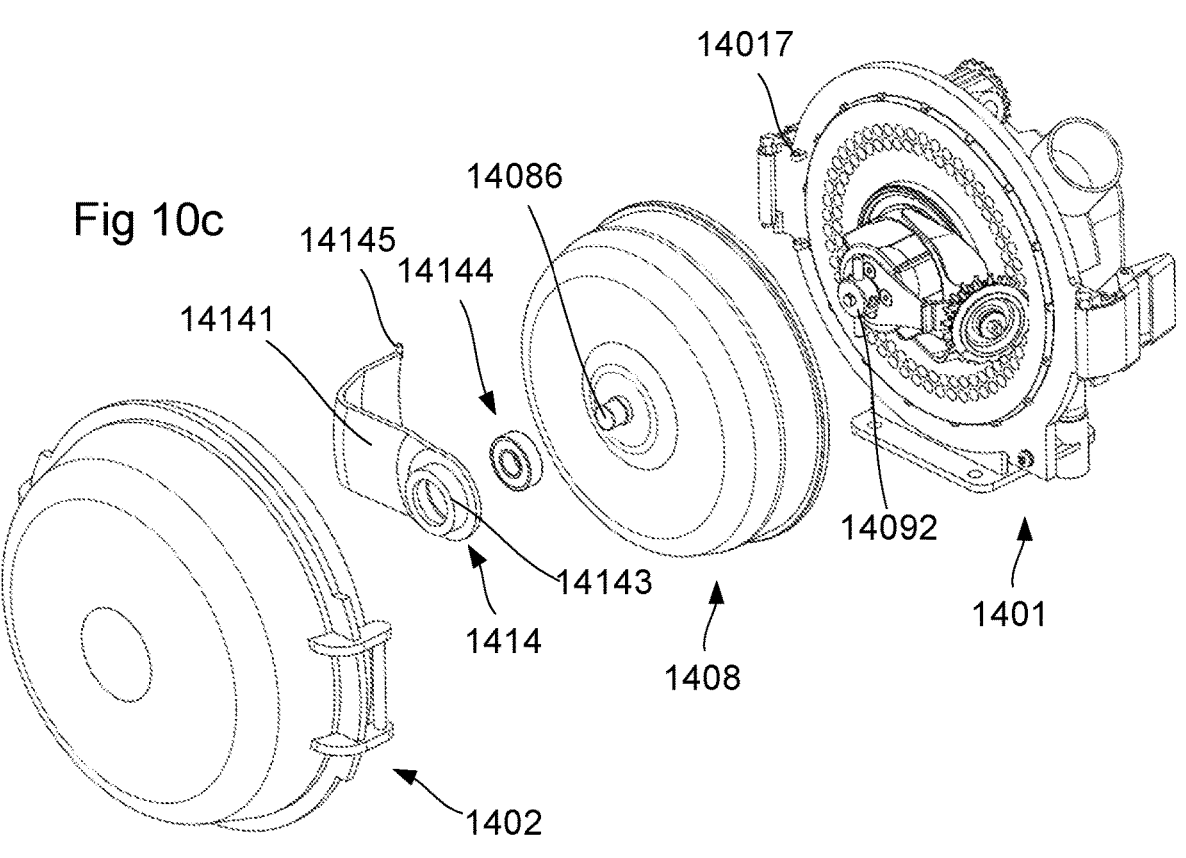
Figure 10D:
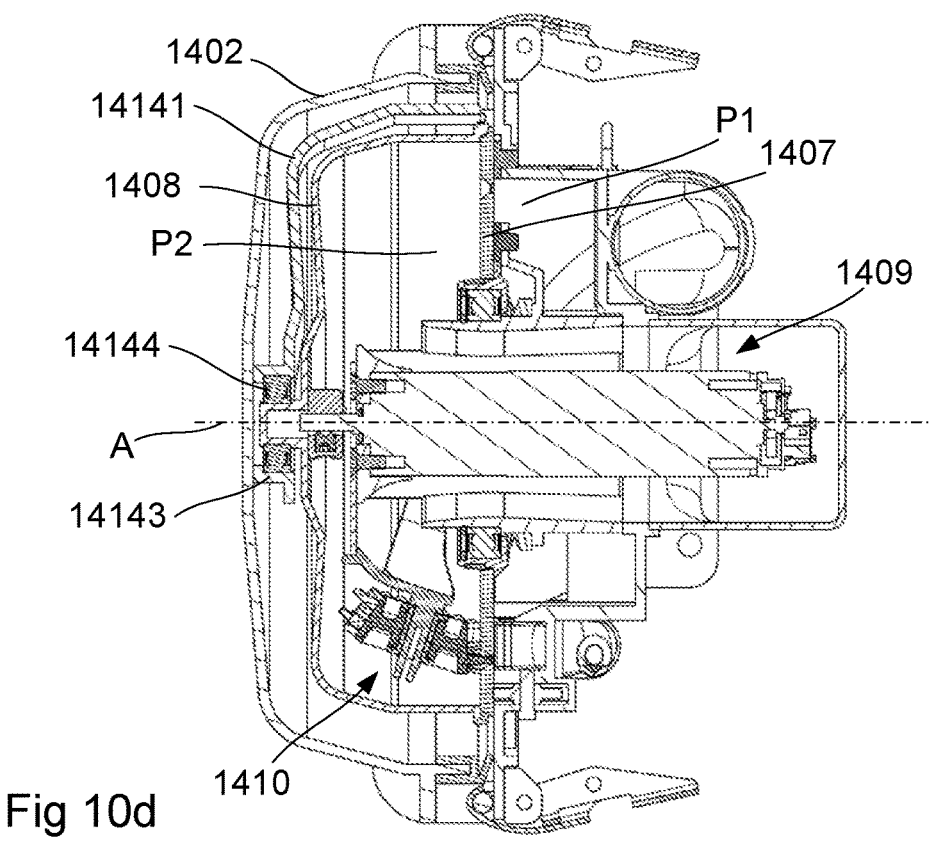

With reference to FIGS. 6-7, the base part 1401 comprises a radial outer wall 14011 and an axial outer wall 14012.

The base part 1401 has a central portion 14013, which is substantially concentric with the radial outer wall 14011. The central portion 14013 can be substantially cylindrical in shape, with a radially outwardly directed surface and a radially inwardly directed surface. The central portion can be mounted on or made integral with or formed in one piece with the axial wall 14012.

A motor holder 14014 is arranged radially inside the central portion 14013.

A motor 1409, such as an electric motor, is arranged in the motor holder 14014. The motor 1409 has a motor body 14091, which is stationary relative to the base part 1401 and can comprise a motor casing and electromagnetically active parts such as magnets, windings, etc., and optionally a gearbox, for example a planetary gear, and a motor shaft 14092, which is driven rotatably relative to the motor body 14091.

The motor holder can be configured for arranging the motor concentrically with respect to the central portion 14013.

The motor holder 14014 can be configured as a space which is adapted in shape and size to receive a motor, such as an electric motor. In different embodiments, the motor holder 14014 can be configured with walls, as a frame, or as a set of supports which can extend substantially radially inwards from a radially inwardly directed surface of the central portion 14013.

For example, the motor holder 14014 can be substantially cylindrical in shape, with a radially outwardly directed surface and a radially inwardly directed surface.

One or more spacer elements 14015 extend between the central portion 14013 and the motor holder 14014 and are configured to form a gap between the inwardly directed surface of the central portion 14013 and the motor or an outwardly directed surface of the motor holder. The gap forms a ventilation duct 14051 extending axially in length between the central portion 14013 and the motor 1409.

The ventilation duct 14051 also facilitates cooling of the motor. Cooling can be further improved by exposing all or parts of the motor body to the ventilation duct. For example, one or more cooling flanges can extend from the motor body out into the ventilation duct.

A bearing 1411 is arranged on the outwardly directed surface of the central portion 14013. The bearing 1411 can be a roller bearing or a slide bearing. An inner part of the bearing 1411, such as an inner ring of a roller bearing, can thus be mounted on the outwardly directed surface of the central portion 14013, and an outer part of the bearing 1411, such as an outer ring of a roller bearing, can be mounted on the central opening 14072 of the singulating disc 1407, such that the singulating disc 1407 is mounted idly rotatably on the central portion 14013.

The bearing can be configured as a sealed bearing. Alternatively, the bearing can be mounted such that air leakage between the central portion and the singulating disc 1407 is avoided.

The ventilation duct 14051 thus extends through the central opening 14072 of the singulating disc.

By means of this arrangement, the motor body 14091 extends through the singulating disc 1407. If the motor body 14091 thus extends between a first axial portion, nearest to an opening for the motor shaft, and a second axial portion, farthest away from the opening for the motor shaft, the singulating disc is located between, and at a distance from, said first and second axial portions. If a distance between said first and second portions is defined as the length of the motor body 14091, then the singulating disc can be located at a distance, from the first axial portion, corresponding to between and 95%, preferably between 20 and 80% or between 20 and 50% of the length of the motor body 14091.

In the example shown, the singulating disc 1407 is completely flat. It will be appreciated that the singulating disc can be configured with a projecting or thicker central portion, nearest to the through-opening 14072. In such cases, the singulating disc and the motor body can be arranged such that no part of the singulating disc is located nearer to the first axial portion than between 0 and 100%, preferably between 5 and 95%, between 20 and 80% or between 20 and 50% of the length of the motor body 14091.

The motor shaft 14092 has a distal end, axially farthest away from the motor body 14091. A coupling device 14093 is arranged at the distal end, for torque-transmitting coupling to the pressurizing bell 1408.

In the example shown, the coupling device 14093 is configured as a transverse rod which extends at right angles to the axis of rotation A of the motor shaft 14092 and which is adapted in size and shape for engagement with a corresponding coupling device 14085 of the pressurizing bell 1408.

The coupling device can, as a non-limiting example, be configured with an axially open conical surface of the coupling device 14085 of the pressurizing bell 1408 and a corresponding conical surface of the coupling device 14093 of the motor shaft. During operation, the motor shaft 14092 is in torque-transmitting engagement with the pressurizing bell 1408 via the coupling devices 14093, 14085.

The pressurizing bell 1408 is in torque-transmitting engagement with the singulating disc 1407 via the engagement elements 14084, 14074. The singulating disc 1407 is mounted idly relative to the base part 1401.

When the motor 1409 is driven, the motor shaft 14092 causes the pressurizing bell 1408 to rotate about the axis of rotation A, wherein the pressurizing bell 1408 pulls the singulating disc 1407 with it, such that the latter is caused to rotate relative to the base part 1401.

In the singulating space, the singulating disc 1407 delimits a high-pressure side P1 and a low-pressure side P2, which are connected through the holes 14073 in the singulating disc 1407. The high-pressure side P1 is fed with compressed air from a compressed air source such as a fan. The low-pressure side P2 is ventilated through the ventilation duct 14051, 14052 to the air outlet 1405. Compressed air also leaves the singulating device 140 through the outlet 1406 for singulated material, which contributes to accelerating the material.

It will be appreciated that a singulating device 140 according to what has been described above can be used both in a precision seed drill and in a volumetrically fed seed drill. In the latter, the singulating device 140 can be used as a flow leveler, for ensuring a level flow of material to the respective material outlet 141.

It will be further appreciated that the ventilation duct 1405 can ventilate the low-pressure side directly to the environment or can be coupled to a filter device or coupled to an air recovery device.

FIG. 8 shows a schematic view of an alternative embodiment of a singulating device 140 in which a driver arrangement comprises an auxiliary frame 1413 whose central portion 14131 can be coupled to the distal portion 14093 of the motor shaft and whose peripheral portion can engage with the singulating disc 1407 in order to cause the latter to rotate.

The fastening to the central portion 14131 of the auxiliary frame can be effected in the same way as described above in the embodiments in which the pressurizing bell 1402 constitutes a driver arrangement. Furthermore, the pressurizing bell 1408 in the embodiment shown in FIG. 8 is mounted on the auxiliary frame 1413 or directly on the distal portion of the motor shaft 14092, for example through a recess 14134 in the central portion 14131 of the auxiliary frame 1413.

The auxiliary frame 1413 can comprise two or more spoke-like structures whose radially outer portion can be fastened to the singulating disc, either at its peripheral portion, as has been described above with reference to the pressurizing bell as driver arrangement, or anywhere along the ring-shaped portion 14071 of the singulating disc.

The pressurizing bell 1408 can be fastened to the singulating disc 1407 in the same way as described with reference to the embodiments in which the pressurizing bell constitutes a driver arrangement. Alternatively, the pressurizing bell can simply bear against the singulating disc sufficiently to produce the necessary sealing, in which case the rotational movement is transmitted from the motor shaft entirely with the aid of the auxiliary frame 1413.

In the example shown, the base part 1401 is configured as in the previously described examples. The auxiliary frame

1413 has a central portion 14131 with a certain radial extent, and three arms 14132 extending axially from the central portion. At its distal end, each arm 14132 has a coupling part 14133, such as a projection, which can engage with a corresponding coupling part 14075 of the singulating disc 1407. In the example shown, the coupling parts 14075 of the singulating disc are located at a distance from the periphery of the singulating disc 1407 and consist of recesses in an axial surface of the singulating disc 1407.

It will be appreciated that the coupling parts 14133, 14075 can be configured in a number of different ways in order to form-fittingly transmit force from the auxiliary frame 1413 to the singulating disc 1407.

The auxiliary frame can be connected releasably to the singulating device, such that they can be mounted/removed as a unit. For example, the auxiliary frame and the singulating device can be connected permanently to each other.

FIGS. 9a-9b show how the singulating device 1407 can be arranged relative to the central portion 14013. The bearing 1411 is shown here in the form of a roller bearing, such as a ball bearing, with an inner ring and an outer ring, with a plurality of roller bodies between them. The inner ring is mounted on the central portion 14013, for example by press-fitting. The inner ring can be mounted axially between a lug of the central portion 14013 and a locking ring 14114. The singulating device 1407 can be mounted on a hub 14112. A seal 14113 can be arranged between the hub 14112 and the singulating device 1407. The seal 14113 can have a conical surface designed to make it easier to mount the singulating device 1407 on the hub.

The outer ring can be arranged relative to the hub 14112 for example by press-fitting. The outer ring can be mounted axially between a lug of the hub 14012 and a locking ring 14115.

A seal 14116 can be arranged on the high-pressure side of the singulating device 1407 in order to provide sealing between the central portion 14013 and the hub 14112. The seal 14116 can be configured with a mounting part and with a lip resiliently movable relative to the latter. The mounting part can be arranged on the central portion 14013, for example by press-fitting or adhesion, with the lip being arranged to bear, preferably with slight pretensioning, against the singulating device 1407 or against the hub 14112.

FIGS. 10a-10d show a further alternative embodiment in which the base part 1401 is configured according to preceding examples, apart from the presence of a joint part 14017 which is located radially outside the singulating device 1407, but in which the pressurizing bell 1408 is arranged on a pivotable arrangement 1414 comprising an arm 14141, which is fastened in an articulated manner to the base part 1401, and in which the pressurizing bell 1408 is idly rotatably supported relative to the arm 14141.

The pivotable arrangement 1414 thus comprises an arm which has a substantially axially extending part and a substantially radially extending part. At the distal end of the axially extending part there is a joint part 14145, which is configured to engage with the joint part 14017 of the base part 1401. The substantially radially extending part of the arm 14141 has a radial extent corresponding to the radial extent of the pressurizing bell, with a fastening portion 14143, such as a recess, which is located on the axis of rotation A (FIG. 10d) and which is configured to receive a bearing 14144, such as a roller bearing.

Furthermore, the pressurizing bell 1408 is configured with a fastening device 14086, such as an axial projection, configured to receive or form part of a second part of the bearing 14144, such that the pressurizing bell 1408 is mounted securely on the centrally located portion of the arm.

The coupling between the motor shaft 14092 and the pressurizing drum 1408 can be such that only transmission of torque is permitted, i.e. at least no axial tensile force is transmitted between the pressurizing drum 1408 and the motor shaft 14092.

Instead, the pressurizing bell 1408 can be secured axially against the motor shaft by means of the cover 1402 bearing against the arm 14141 and/or against the bearing 14144 and thus preventing the pressurizing bell 1408 from separating axially from the motor shaft 14092.

The engagement of the pressurizing bell 1408 with the singulating device 1407 can be configured as has been described above with reference to FIGS. 2-7.

Figure 11:
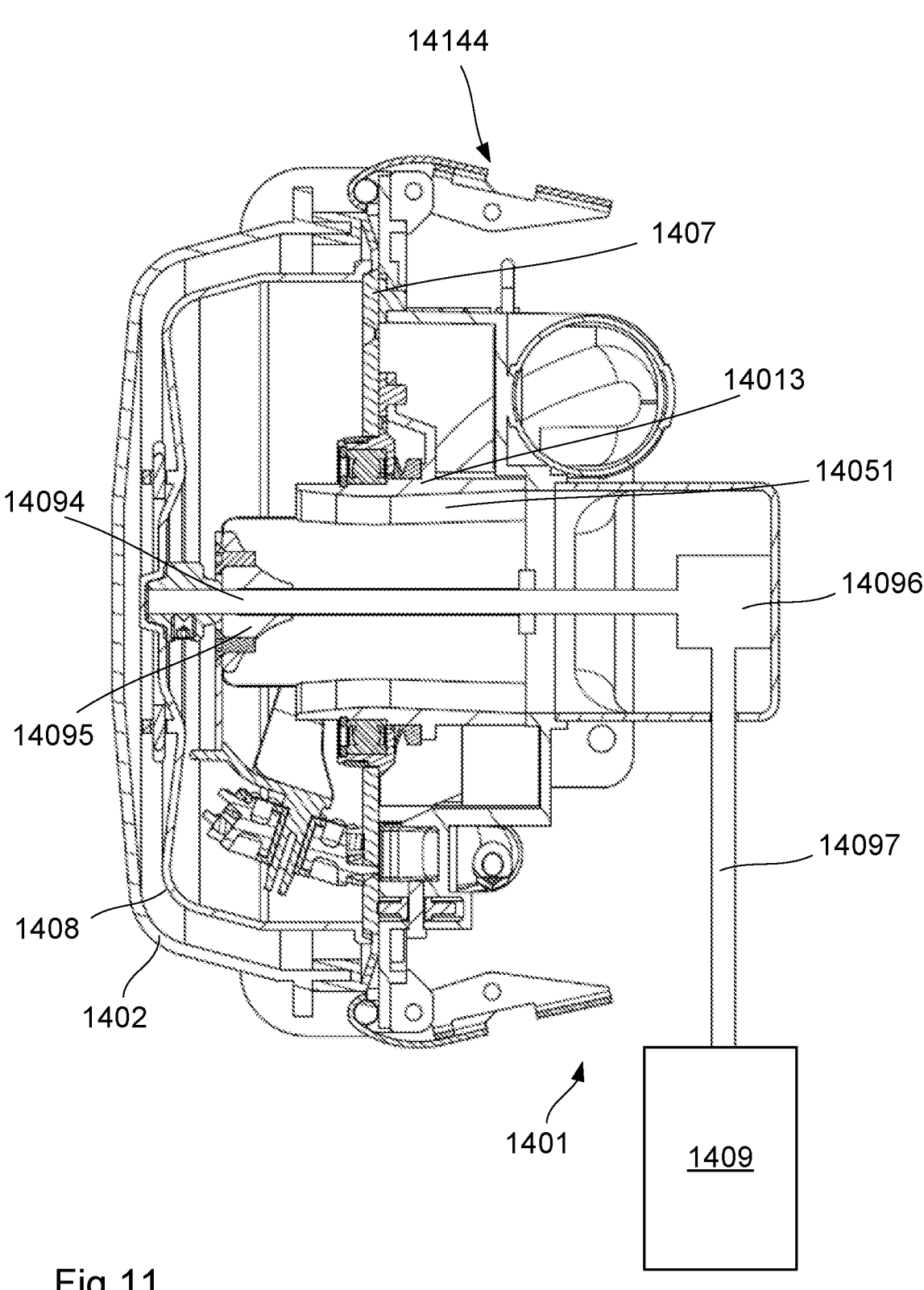
FIG. 11 shows another alternative configuration of the singulating device.

FIG. 11 shows an embodiment which substantially corresponds to the embodiments described with reference to FIGS. 2-7 and 9, but in which the motor 1409 has been moved from the central portion 14013.

Instead, a lengthened drive shaft 14094 has been arranged and routed through a guide 14095, which can comprise bearings, seals, etc., for ensuring the stability of the drive shaft. The drive shaft 14094 can be connected to a transmission 14096, which in turn can be connected to the motor 1409 via a force transmission 14097, such as an axle, a belt, a chain, a toothed arrangement or similar.

By moving the motor to outside the base part 1401, as is shown in FIG. 11, a motor can be arranged to drive two or more singulators, for example via an arrangement involving force transmission with the aid of a chain or belt.

According to alternative embodiments, the bell and the singulating disc can be configured as one part. The sealing part 1410, which can be mounted foldably in order to permit dismantling of the singulating device 1407, can then be accessible through a flap or a hatch in the pressurizing bell 1408.

Alternatively, the sealing part 1410 can be spring-loaded and pretensioned against the singulating part and can be switched between two stable positions (working position and service position), the latter position permitting dismantling of the singulating device. Switching between the positions can be effected by detaching the assembly made up of singulating device and pressurizing bell, wherein the sealing part 1410 folds out by bearing against the singulating device when the latter is pulled along its axis of rotation, and wherein the sealing part 1410 folds in by bearing against the pressurizing bell when the assembly made up of singulating device and pressurizing bell is driven along its axis of rotation.

The arm 14141 can be configured as a yoke which extends over the entire pressurizing bell and which, at the part corresponding to the joint, can be anchored against the base part 1401.

As a further alternative, the arm can be configured to be able to be unhooked rather than being able to pivot out. This is intended to facilitate access to the singulating disc when the singulating devices are placed close together, as in the case with small row spacings.

It is also possible to mount the arm 14141 in an articulated manner on the cover 1402.

FIGS. 12-15 show four basically different embodiments of singulating part 1407 and closure part 1408. Reference sign M denotes schematically how granular material is intended to be collected in the respective embodiment. Moreover, the same reference signs as in FIGS. 2-11 are used for corresponding parts.

FIG. 12 shows an embodiment which corresponds to the embodiment shown in FIGS. 2-11, i.e. with a singulating part 1407 in the form of a substantially flat singulating disc with axially open through-holes, which is mounted on the central portion 14013, and with a closure part 1408 in the form of a pressurizing bell, which is mounted on the motor shaft 14092.

FIG. 13 shows a variant which corresponds to the one shown in FIG. 12 but in which the singulating part 1407 is configured such that the through-holes are arranged in a conical surface. In the example shown in FIG. 13, the closure part is configured as a pressurizing bell, but it can also be configured as a substantially flat part, as is shown in FIG. 14.

FIG. 14 shows a variant in which the singulating part 1407 is configured as a substantially cylindrical drum, with the through-holes open radially outwards, such that the material is taken up on a lateral surface.

The drum can be axially open and provided with a closure part 1408 in the form of a flat part, or in the form of a bell, as in FIG. 12 and FIG. 13.

Alternatively, the closure part 1408 can be fixable, for example permanently or releasably fixable, to the singulating part 1407.

FIG. 15 shows a further alternative in which the singulating part 1407 is configured substantially as a disc, with axially open holes as in FIG. 12, but with an axially extending peripheral edge which engages with the edge portion of the closure part 1408. The closure part 1408 can be configured as a bell (as in FIGS. 12 and 13) or as a disc (FIG. 14).

It will be appreciated that, whichever of the embodiments shown in FIGS. 12-15 is chosen, it is possible for the driver arrangement to be integrated with the closure part 1408 or to be configured as a separate part, an auxiliary frame, as is shown in FIG. 8.

It will also be appreciated that, whichever of the embodiments shown in FIGS. 12-15 is chosen, it is possible to arrange the closure part 1408 on a pivotable arrangement, as is shown in FIGS. 10*a*-10*d*.

The invention claimed is:

1. Singulating device for singulating granular material, comprising:
   a base part,
   a singulating part, which is rotatable relative to the base part and which has a plurality of through-holes for receiving individual granules from said granular material with the aid of a pressure difference between opposite sides of the singulating part,
   a closure part which is rotatable relative to the base part and which is attachable to the singulating part, in order to form a closable space, such that the closure part is rotatable together with the singulating part, and
   a motor for driving the closure part and the singulating part,
   wherein a drive shaft driven by the motor is couplable to a driver arrangement in order to cause the driver arrangement to rotate,
   wherein the singulating part is drivable by rotation of the driver arrangement, and
   wherein the closure part is releasably fixable to the singulating part, and
   wherein, in a position when the closure part is disengaged from the singulating part, the singulating part is idly rotatably supported on the base part.

2. Singulating device according to claim 1, wherein the singulating part is mounted and supported on the base part.

3. Singulating device according to claim 1, wherein the base part has an outer wall and a central portion located at a distance radially inwards from the outer wall, wherein the singulating part is mounted and supported on the central portion.

4. Singulating device according to claim 1, wherein the motor comprises a motor body, wherein the drive shaft is drivable in rotation relative to the motor body, and wherein the motor body is mounted on the base part and extends through the singulating part.

5. Singulating device according to claim 3, wherein the drive shaft extends through the central portion, and wherein a ventilation gap for ventilation of a low-pressure side of the singulating part lies between the drive shaft and an inner surface of the central portion.

6. Singulating device according to claim 5, further comprising a transmission device, wherein the motor is connected to the drive shaft via the transmission device.

7. Singulating device according to claim 5, further comprising a guide, which is arranged between the drive shaft and the central portion, such that said ventilation gap for ventilation of a low-pressure side of the singulating part lies between the guide and the inner surface of the central portion.

8. Singulating device according to claim 1, wherein the driver arrangement comprises an auxiliary frame which can form-fittingly engage with the singulating part for torque transmission.

9. Singulating device according to claim 1, wherein the driver arrangement is integrated with the closure part.

10. Singulating device according to claim 9, wherein the driver arrangement is formed by the closure part.

11. Singulating device according to claim 1, wherein the closure part has an axial edge portion which is configured for engagement, especially form-fit engagement, with an edge portion of the singulating part.

12. Singulating device according to claim 1, wherein the singulating part has a radially outer edge portion which is configured for engagement, especially form-fit engagement, with an edge portion of the closure part.

13. Singulating device according to claim 1, wherein a distal end of the motor shaft has a coupling device for torque-transmitting coupling to a corresponding coupling device of the driver arrangement.

14. Singulating device according to claim 1, further comprising an arm, wherein the closure part is idly rotatably supported relative to the arm, and wherein the arm can be pivotably fastened radially outside the singulating part.

15. Singulating device according to claim 1, further comprising a cover which is attachable to the base part such that the base part and the cover enclose a singulating space in which the closure part and the singulating part are rotatable, and in which, when said pressure difference between opposite sides of the singulating part is obtained, a higher pressure is present in the singulating space than in a space that is defined by the closure part and the singulating part.

16. Agricultural implement, especially a seed drill, for distributing granular material to ground over which the agricultural implement travels, comprising a plurality of material outlets, wherein at least some of the material outlets are associated with a singulating device according to claim 1, which is configured to supply the material outlet with singulated seed.

17. Method of distributing granular material to ground from an agricultural implement which comprises one or more singulating devices, each of them comprising:

a base part, a singulating part, which is rotatable relative to the base part and which has a plurality of through-holes for receiving individual granules from said granular material with the aid of a pressure difference between opposite sides of the singulating part, a closure part which is rotatable relative to the base part and which is attachable to the singulating part, such that the closure part is rotatable together with the singulating part, and a motor for driving the closure part and the singulating part, wherein the method comprises:

causing the driver arrangement to rotate with the aid of the motor, and transmitting rotation from the driver arrangement to the singulating part, wherein the singulating part is idly rotatably supported on the base part when the closure part is disengaged from the singularing part.

18. Method according to claim 17, wherein the rotation is transmitted with the aid of the closure part, which is form-fittingly connected to the motor and to the singulating part.

19. Method according to claim 18, wherein the rotation is transmitted by engagement between an axial edge portion of the closure part and a radial edge portion of the singulating part.

20. Method according to claim 17, wherein the rotation is transmitted with the aid of an auxiliary frame which is form-fittingly connected to the motor and to the singulating part.

* * * * *